United States Patent [19]

Teramachi

[11] 4,118,101

[45] Oct. 3, 1978

[54] DOUBLE SLIDE WAY BEARING INCLUDING RECIRCULATING BALL BEARINGS

[76] Inventor: Hiroshi Teramachi, 2-34-9 Higashi-Tamogawa Setagaya-ku, Tokyo, Japan

[21] Appl. No.: 838,144

[22] Filed: Sep. 30, 1977

[30] Foreign Application Priority Data

Sep. 30, 1976 [JP] Japan ............... 51/116501

[51] Int. Cl.$^2$ ............................. F16C 29/06
[52] U.S. Cl. ................... 308/6 C; 108/143; 248/346; 308/3 A
[58] Field of Search ............ 308/3 R, 3 A, 6 R, 6 B, 308/6 C, 6 A, 185, 189 R, 189 A, 194; 214/1 H; 193/38, 35 MD, 41; 64/23, 23.7; 74/471, 491; 248/23, 55, 346 R; 108/143, 137, 138; 104/134, 162

[56] References Cited

U.S. PATENT DOCUMENTS

| 3,270,591 | 9/1966 | Winter ........................... 308/3 R X |
| 3,495,519 | 2/1970 | Alfsen et al. ..................... 108/137 |
| 3,564,970 | 2/1971 | Larsen ............................ 308/6 C |
| 3,897,982 | 8/1975 | Teramachi ..................... 308/3 A X |
| 4,005,913 | 2/1977 | Thomson, Jr. .................. 308/6 C |

*Primary Examiner*—Blix, Trygve M.
*Assistant Examiner*—Douglas C. Butler
*Attorney, Agent, or Firm*—Arthur T. Fattibene

[57] ABSTRACT

A double slide way bearing adapted to carry and locate a heavy object such as a machine tool within a plane which includes at least one main body having an upper and a lower rail-receiving grooves formed in its upper and lower surfaces to extend typically in two orthogonal directions. The upper rail-receiving groove is adapted to receive an upper rail bed which fixedly carries the object, while the lower rail-receiving groove is adapted to receive a lower rail bed which is fixed to a base. Between the rail-receiving groove and the rail bed, at each of the upper and the lower sides of the main body, interposed are loaded and unloaded balls which are adapted to roll along respective paths defined by grooves formed in the inner peripheral wall of each rail-receiving groove and in the surface of the associated rail bed, so that the object may be slidingly moved in the directions in which the upper and the lower rail beds extend to any desired position within a plane including the upper rail bed. The inner peripheral wall of each rail-receiving groove constitute outer races of a plurality of rows of balls to directly guide the latter, so that the main body can be made compact and the bearing can have sufficient rigidity to provide a precise location of object.

7 Claims, 4 Drawing Figures

DOUBLE SLIDE WAY BEARING INCLUDING RECIRCULATING BALL BEARINGS

BACKGROUND OF THE INVENTION

The present invention relates to a bearing adapted to allow a sliding movement of heavy objects such as a machine tool or the like mounted thereon and, more particularly, to a double slide way bearing adapted for allowing longitudinal and transverse linear sliding movement to locate the object precisely. An object and advantageous feature of this invention will become clear from the following description of the preferred embodiment illustrated by the attached drawings.

DESCRIPTION OF THE PREFERRED EMBODIMENTS

Figure 1:
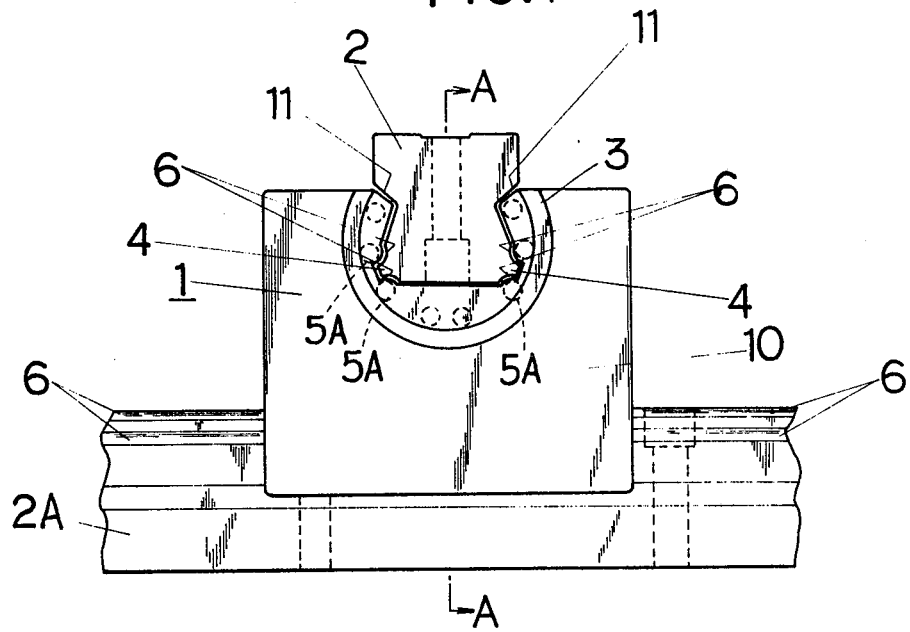
FIG. 1 is a side elevational view of a double slide way bearing embodying the present invention.
Figure 2:
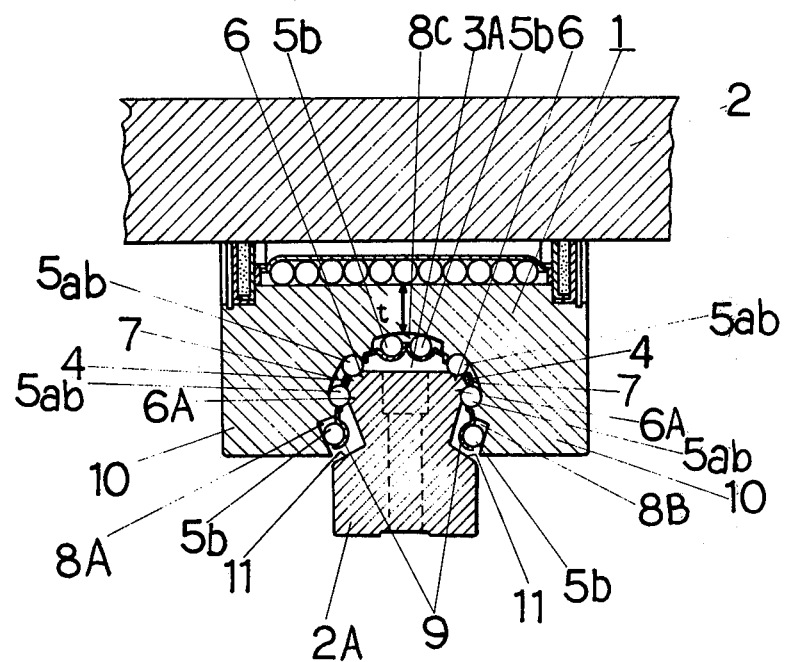
FIG. 2 is a sectional view taken along the line A-A of FIG. 1.
Figure 3:
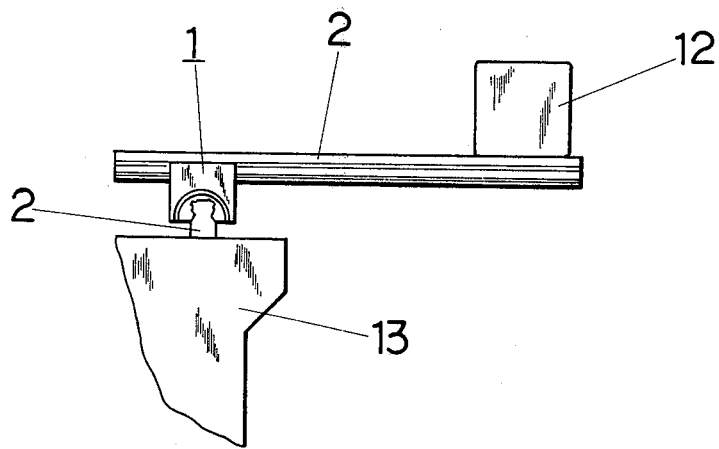
FIG. 3 is an illustration of an apparatus employing the double slide way bearing of FIG. 1.

Referring to FIGS. 1 and 2, there is shown practical embodiment of the present invention. The main body 1 of a double slide way bearing, in accordance with the invention, comprises a substantially rectangular thick-walled material or block. The main body or block 1 has an upper and a lower rail-receiving grooves 3,3A, respectively formed in its upper and lower surfaces, respectively. These rail-receiving grooves 3, 3A extend at right angle to each other, for receiving respective rail beds 2,2A. These rail beds 2,2A having same shape and similiarly constructed are opposed by each other when received by respective rail-receiving grooves 3,3A.

Each rail bed 2 and 2A has a cross-section which is symmetrical along a transverse section. The rail bed 2 has two opposing shoulder portions 4,4, each of which is formed so as to extend in the longitudinal direction along the rail bed to define roll grooves 6,6 or bearing race for receiving loaded balls 5a, 5a.

At both side portions of each rail bed 2, 2A there are formed recesses 11,11 extending in the longitudinal direction of the rail bed which confront the respective skirt portions 10,10 of the main body 1 which straddle the rail bed 2.

The rail-receivng groove 3A formed in the lower surface of the bearing body 1 has longitudinal grooves 7,7 which cooperate with roll grooves 6A,6A of the rail bed 2A to define four rails for the loaded balls $5a^b$, $5a^b$. At both sides of the grooves 7,7, are grooves 8A,8B,8C through which are circulated the non-loaded balls 5b,5b. Thus, four endless ball rails are formed by these complementary grooves 7,7 and 8A,8B,8C, and the respective loaded and non-loaded balls receiving groove 3, by means of a ball retainer 9.

The four rails for the loaded balls 5a,5a are disposed on a common circle so that any twisting load applied to the main body 1 with respect to the rail bed 2 is effectively distributed to all loaded balls 5a...

The respective rail beds 2 and 2A are recessed at both its side portions as at 11,11. For example, one of two rails for loaded balls formed by two grooves 6A,6A on each of shoulders 4 of the rail bed 2 and by a cooperative groove 7 of the main body is constructed so as to embrace, in combination with the recess 11, the shoulder 4 of the rail bed 2A, so that the loaded balls $5a^b$ received by this rail may carry a load which tends to pull the main body 1 away from the rail bed 2A.

The rail-receiving groove 3 formed in the upper surface of the main body 1 has an identical construction to the rail-receiving groove 3A formed in the lower surface of the main body 1. These rail-receiving grooves 3,3A are opposed by each other and extend at right angle to each other. The rail-receiving guide 3 formed in the upper surface of the main body 1 receives the associated rail bed 2 which has the same construction as that received by the lower rail-receiving groove 3A.

It will be seen that the double slide way bearing in accordance with the invention can slide along the lower rail bed 2A in the longitudinal direction, while the upper rail bed 2 received by the upper rail-receiving groove 3 is allowed to slide in the transverse direction, i.e. in the direction at right angles to the lower rail bed 2A.

Thus, an object 12 fixed to the upper rail bed 2 can move linearly in two orthogonal directions and therefore can precisely be located In the double slide way bearing of the invention, the loads acting in all directions between the main body 1 and the upper and lower rail beds 2,2A are fairly supported by four rails carried in the upper and lower rail-receiving grooves 3,3A of the main body 1.

For instance, a twisting load on the lower rail bed 2A, i.e. a load which causes a force which tends to rotate the main body 1 around the axis of the lower bed 2A and, therefore, to twist the lower rail bed 2A around its axis can be safely borne by the bearing of the invention. Such a load is often caused when the upper rail bed 2 slides on the main body 1 rightward, after the object 12 has been moved in the longitudinal direction of the lower rail bed, so as to put the object 12 away from the main body 1.

In addition, partly because the rail-receiving grooves, 3,3A are directly formed on the upper and lower surfaces of the main body 1, and partly because the inner peripheral surfaces of the rail-receiving grooves 3,3A constitute the outer races of the bearing, it becomes possible to make the distance between the upper and lower rail beds 2,2 as small as possible, preserving a thickness $t$ of the main body 1 (See FIG. 2) between the lower surface of the upper rail-receiving groove 3 and the upper surface of the lower rail-receiving groove 3A. This means that the bearing main body 1 can be made compact.

In addition, since the inner peripheral walls of the rail-receiving grooves 3,3A constitute the outer races of the bearing, the rigidity or stiffness of the bearing as a whole is much larger as compared with conventional bearings in which outer races are formed as separate bodies, so as to ensure a highly precise sliding motion. At the same time, the bearing main body can be attached to the rail beds 2,2A at a high dimensional precision and low cost of manufacture.

As mentioned before, the bearing of the invention is so constructed as to exert a sufficiently large resisting force against a load which tends to move the bearing main body 1 away from either one of the rail beds 2,2A.

Figure 4:
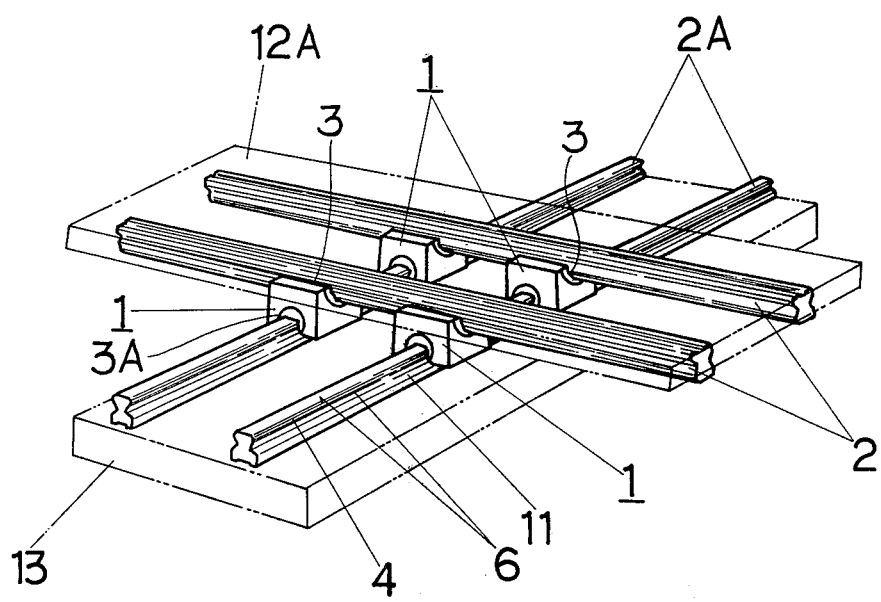
FIG. 4 is an illustration of an apparatus employing two double slide way bearings as shown in FIG. 1.

FIG. 4 shows a structure for supporting a large and heavy object 12A, by means of four main bodies, 1,1,1,1. More specifically, referring to FIG. 4, two parallel rail beds 2A,2A are fixed onto a base 13. Each of these rail beds 2A,2A carries two bearing main bodies 1,1 and 1,1. Two groups of main bodies 1,1 carry respectively a parallel upper rail beds 2,2 which in combination carry the large-sized heavy object 12A, so that the latter object 12A may be slidingly moved in two orthogonal directions. As the object 12A is moved right or leftward, the main bodies 1,1 on one of the lower rail bed 2A comes to be subjected to compression, while the main bodies 1,1 on the other lower rail bed 2 comes to be subjected to a tension or pulling force. However, due to the aforementioned resisting force against the pulling load, the large-sized heavy object 12A can fairly be supported without being inclined.

In the described embodiment, the upper and lower rail-receiving grooves 3,3A cross each other at right angle for receiving two orthogonal rail beds 2,2A. However, this is not exclusive and the angle at which the upper and the lower rail beds 2,2A intersect each other, i.e. the angle at which the upper and the lower rail-receiving grooves 3,3A intersect can be optionally selected as the occasion demands.

At the same time, one of the rail-receiving grooves 3,3A may be inclined in the longitudinal direction thereof, so that the object 12A may be located along an inclined plane.

As has been described, in the double slide way bearing of the invention, loaded and unloaded balls held by a retainer are received by grooves formed in the upper and the lower surfaces of a main body, so as to enhance the capacity of the bearing and to diminish the distance between the upper and the lower rail beds, thereby to afford the linear movement of the object in two directions allowing a highly precise location of the sliding object.

The advantageous features of the bearings as described can be practically used in various ways of use.

What is claimed is:

1. A double slideway bearing assembly capable of resisting torsional forces incurred in predetermining positioning a relative heavy workpiece at a given point in a plane comprising at least one bearing block, said bearing block having opposed surface portions, a rail groove formed in each of said opposed surface portions, said rail grooves being disposed at an angle to one another, an elongated rail bed disposed in each of said rail grooves whereby said rail beds are disposed at an angle relative to each other, said rail grooves and its associated rail bed having complementary bearing surfaces to define at least a pair of oppositely disposed bearing races, a plurality of ball bearings disposed on each of said opposed bearing races, a retainer means disposed between the surface of said rail grooves and associated rail bed for retaining said ball bearings therebetween, said retaining means and respective rail groove having opposed complementary bearing portions to define a return raceway, said return raceway defining with said first mentioned bearing races a continuous endless raceway for said ball bearing whereby the ball bearing in said bearing races are loaded and the ball bearing in said return raceway are non-loaded whereby said rail beds are rendered respectively moveable relative to said bearing block and to each other.

2. A double slideway bearing assembly as defined in claim 1 wherein each of said rail grooves is arcuate in cross-section, and each of said bed rails have opposed shoulder portions extending longitudinally of the respective bed rails, each of said shoulder portions being disposed between a pair of rail bearing grooves, said rail grooves having a longitudinal groove complementing said pair of rail bearing grooves to define a bearing raceway therebetween, said rail beds each including opposed recessed portions to one side of said pair of rail bearing grooves, and said rail grooves having opposed grooves disposed opposite said recessed portions, and a base groove extending along the base of said respective rail groove, and said retainer means having complementary bearing portions in said recessed portions and opposite said base groove to define an endless raceway with said rail bearing grooves, said complementary bearing portions of said retainer means being disposed to either side of said rail bearing grooves.

3. A double slideway bearing assembly as defined in claim 1 and including at least a pair of spaced apart rail beds, a pair of bearing blocks disposed on each of said pair of spaced apart rail beds, and a rail bed carried on each of said pair of bearing blocks whereby said respective pairs of rail beds are disposed at an angle relative to each other, and whereby said respective pairs of rails are rendered relatively moveable in two directions relative to each other.

4. A double slideway bearing assembly as defined in claim 1 wherein the base of said rail groove is spaced from its associated rail bed; and said bearing portions of said retainer means defining the return raceway for the non-loaded balls being spaced from the surface of its associated rail bed.

5. A double slideway bearing assembly comprising a base, a base rail rigidly secured to said base, a bearing block having opposed surface portions, a rail groove formed in each of said opposed surface portions, said rail groove in each of said surface portions being angularly disposed, and said respective rail grooves being open to its respective surface portion of said bearing block, said block being slideably disposed on said base rail, a table, a table rail rigidly connected to said table, said table rail being slideably disposed in the other rail groove of said bearing block, and a bearing means interposed between each of said rails and its complementary rail groove of said bearing block, said bearing block being slideably disposed on said rails between said base and said table rigidly connected to its respective rail.

6. A double slideway bearing assembly as defined in claim 5 wherein said bearing means between said rail and its respective rail groove having complementary bearing surfaces to define at least a pair of oppositely disposed load ball bearing races, said bearing portion of said respective rails extending longitudinally of the respective rails, ball bearings disposed in said loaded ball bearing races, and a retainer means for retaining said ball bearing in said races.

7. A double slideway bearing assembly as defined in claim 6 wherein said rail groove and said retainer means have complementary bearing surfaces defining at least a pair of non-loaded ball bearing races being connected in communication with corresponding loaded ball bearing races to form an endless raceway for said ball bearings.

* * * * *